United States Patent
Ryu et al.

(10) Patent No.: US 10,024,244 B2
(45) Date of Patent: Jul. 17, 2018

(54) SYSTEM AND METHOD FOR CONTROLLING VALVE TIMING OF CONTINUOUS VARIABLE VALVE DURATION ENGINE

(71) Applicant: Hyundai Motor Company, Seoul (KR)

(72) Inventors: In Sang Ryu, Incheon (KR); Ingee Suh, Yongin-si (KR); Kyoung Pyo Ha, Seongnam-si (KR); Back Sik Kim, Osan-si (KR); Kiyoung Kwon, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 60 days.

(21) Appl. No.: 14/955,445

(22) Filed: Dec. 1, 2015

(65) Prior Publication Data

US 2017/0082037 A1  Mar. 23, 2017

(30) Foreign Application Priority Data

Sep. 21, 2015 (KR) .................... 10-2015-0133336

(51) Int. Cl.
*F01L 1/34* (2006.01)
*F02D 13/02* (2006.01)
*F01L 13/00* (2006.01)

(52) U.S. Cl.
CPC ...... *F02D 13/0211* (2013.01); *F01L 13/0015* (2013.01); *F01L 2013/111* (2013.01); *Y02T 10/18* (2013.01)

(58) Field of Classification Search
CPC ............ F02D 13/0211; F01L 13/0015; F01L 2013/111
USPC ................... 123/90.15, 90.16, 90.17
See application file for complete search history.

(56) References Cited

U.S. PATENT DOCUMENTS

| | | | | |
|---|---|---|---|---|
| 4,995,351 A | * | 2/1991 | Ohkubo | ............. F02D 13/0215 123/90.11 |
| 7,213,552 B1 | * | 5/2007 | Griffiths | ................. F01L 1/026 123/90.15 |
| 2015/0101319 A1 | | 4/2015 | Takada et al. | |

FOREIGN PATENT DOCUMENTS

| | | |
|---|---|---|
| JP | 11-141314 A | 5/1999 |
| JP | 2006-046293 A | 2/2006 |
| JP | 2006-336659 A | 12/2006 |
| JP | 4816580 B2 | 9/2011 |
| JP | 2013-68211 A | 4/2013 |

(Continued)

*Primary Examiner* — Zelalem Eshete
(74) *Attorney, Agent, or Firm* — Morgan, Lewis & Bockius LLP

(57) ABSTRACT

A method for controlling valve timing of continuous variable valve duration engine may include continuous variable valve duration (CVVD) device and continuous variable valve timing (CVVT) device including determining target intake valve open (IVO) timing, target intake valve close (IVC) timing, target exhaust valve open (EVO) timing and target exhaust valve close (EVC) timing; determining target intake CVVD, target exhaust CVVD, target intake CVVT and target exhaust CVVT to satisfy the target IVO, IVC, EVO, and EVC timings; performing feedback control of the CVVD by learning minimum value of the CVVD and maximum value of the CVVD; performing feedback control of the CVVT based on profile information of the valve; and determining real IVO timing, real IVC timing, real EVO timing, and real EVC timing based on the feedback control of the CVVD and the feedback control of the CVVT.

7 Claims, 3 Drawing Sheets

(56) References Cited

FOREIGN PATENT DOCUMENTS

JP          5591204 B2    8/2014
WO   WO 2013-171830 A1   11/2013

* cited by examiner

SYSTEM AND METHOD FOR CONTROLLING VALVE TIMING OF CONTINUOUS VARIABLE VALVE DURATION ENGINE

CROSS-REFERENCE TO RELATED APPLICATION

The present application claims priority to and the benefit of Korean Patent Application No. 10-2015-0133336 filed on Sep. 21, 2015, the entire contents of which is incorporated herein for all purposes by this reference.

BACKGROUND OF THE INVENTION

Field of the Invention

The present invention relates to a system and a method for controlling valve timing of a continuous variable valve duration engine. More particularly, the present invention relates to a system and a method for controlling valve timing of a continuous variable valve duration engine that simultaneously controls duration and timing of the continuous variable valve.

Description of Related Art

An internal combustion engine combusts mixed gas in which fuel and air are mixed at a predetermined ratio through a set ignition mode to generate power by using explosion pressure.

In this case, a cam shaft is driven by a timing belt connected with a crank shaft that converts linear motion of a cylinder by the explosion pressure into rotating motion to actuate an intake valve and an exhaust valve, and while the intake valve is opened, air is suctioned into a combustion chamber and while an exhaust valve is opened, gas which is combusted in the combustion chamber is exhausted.

In the operations of the intake valve and the exhaust valve, only when a valve lift and a valve opening/closing time (timing) are controlled according to a rotational speed of an engine, optimal engine performance can be secured. Therefore, a continuous variable valve duration (CVVD) device controlling an opening period of an intake valve and an exhaust valve of the engine and a continuous variable valve timing (CVVT) device controlling an opening and closing timing of the intake valve and the exhaust valve of the engine have been developed.

FIG. 3 is a diagram showing a situation in which a CVVD device and a CVVT device control an intake valve and an exhaust valve of the engine.

The CVVD device adjusts an opening period (duration) of the valve with fixing a time point of maximum opening (peak lift), and the CVVT device advances or delays an opening and closing timing of the valve. That is, if an opening timing of the valve is determined, the closing timing is automatically determined according to duration of the valve.

However, both the CVVD device and the CVVT device are used in the engine, duration and timing of the valve should be simultaneously controlled.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a system and a method for controlling valve timing of a continuous variable valve duration engine having advantages of simultaneously controlling duration and timing of the continuous variable valve by independently controlling an opening and closing timing of an intake valve and an exhaust valve.

An exemplary embodiment of the present invention provides a method for controlling valve timing of a continuous variable valve duration engine including a continuous variable valve duration (CVVD) device and a continuous variable valve timing (CVVT) device that may include determining a target intake valve open (IVO) timing, a target intake valve close (IVC) timing, a target exhaust valve open (EVO) timing and a target exhaust valve close (EVC) timing; determining a target intake CVVD, a target exhaust CVVD, a target intake CVVT and a target exhaust CVVT to satisfy the target IVO, IVC, EVO, and EVC timings; performing a feedback control of the CVVD by learning a minimum value of the CVVD and a maximum value of the CVVD; performing a feedback control of the CVVT based on profile information of the valve; and determining a real IVO timing, a real IVC timing, a real EVO timing, and a real EVC timing based on the feedback control of the CVVD and the feedback control of the CVVT.

The target IVO, IVC, EVO, and EVC timings may be determined by a crank angle of 1 mm lift reference point.

The minimum value of the CVVD may learn a value of long duration and the maximum value of the CVVD may learn a value of short duration.

The feedback control of the CVVT may detect a position of a camshaft and may be performed according to the position of the camshaft.

The profile information of the valve may include a crank angle and CVVD data at a time point of maximum opening (peak lift).

Another exemplary embodiment of the present invention provides a system for controlling valve timing of a continuous variable valve duration engine that may include a data detector detecting data related to a running state of the vehicle; a camshaft position sensor detecting a position of a camshaft; a continuous variable valve duration (CVVD) device controlling an opening time of an intake valve and an exhaust valve of the engine; a continuous variable valve timing (CVVT) device controlling an opening and closing timing of the intake valve and the exhaust valve of the engine; and a controller determines an intake valve open (IVO) timing, an intake valve close (IVC) timing, an exhaust valve open (EVO) timing and an exhaust valve close (EVC) timing based on signals from the data detector and the camshaft position sensor, and controls the CVVD device and the CVVT device according to the determined the IVO, IVC, EVO, and EVC timings.

The controller may determine the IVO, IVC, EVO, and EVC timings by determining a target intake CVVD, a target exhaust CVVD, a target intake CVVT and a target exhaust CVVT and performing a feedback control of the CVVD and a feedback control of the CVVT.

The controller may determine a target IVO timing, a target IVC timing, a target EVO timing and a target EVC timing and determines the target intake CVVD, the target exhaust CVVD, the target intake CVVT and the target exhaust CVVT to satisfy the target IVO, IVC, EVO, and EVC timings.

The data may include information on at least one of a vehicle speed, an engine speed, an oil temperature, an amount of air flow and a position value of an accelerator pedal.

As described above, according to an exemplary embodiment of the present invention, duration and timing of the continuous variable valve is simultaneously controlled, so the engine may be is controlled under optimum conditions.

That is, an opening timing and a closing timing of the intake valve and the exhaust valve is optimally controlled, thereby improving fuel efficiency under a part load condition and power performance under a high load condition.

In addition, a starting fuel amount may be reduced by increasing a valid compression ratio, and exhaust gas may be reduced by shortening time of heating a catalyst.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
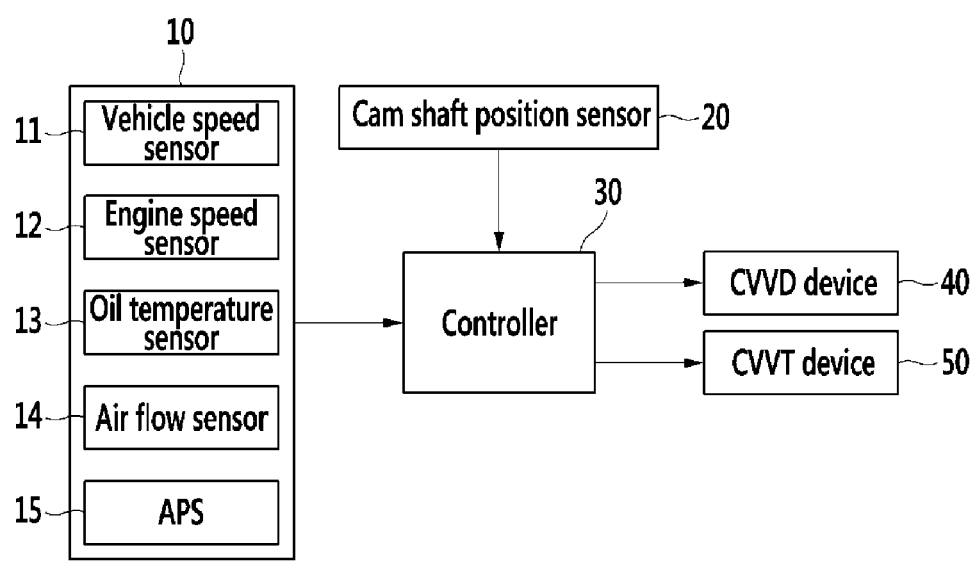
FIG. 1 is a schematic block diagram showing a system for controlling valve timing of a continuous variable valve duration engine according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following detailed description, only certain exemplary embodiments of the present invention have been shown and described, simply by way of illustration. As those skilled in the art would realize, the described embodiments may be modified in various different ways, all without departing from the spirit or scope of the present invention.

It is understood that some of the methods may be executed by at least one controller. The term controller refers to a hardware device that includes a memory and a processor configured to execute one or more steps that should be interpreted as its algorithmic structure. The memory is configured to store algorithmic steps, and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, a controller, or the like. Examples of computer readable media include, but are not limited to, ROM, RAM, compact disc (CD)-ROM, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

Throughout this specification and the claims which follow, unless explicitly described to the contrary, the word "comprise" and variations such as "comprises" or "comprising" will be understood to imply the inclusion of stated elements but not the exclusion of any other elements.

Like reference numerals designate like elements throughout the specification.

An exemplary embodiment of the present invention will hereinafter be described in detail with reference to the accompanying drawings.

FIG. 1 is a schematic block diagram showing a system for controlling valve timing of a continuous variable valve duration engine according to an exemplary embodiment of the present invention.

As shown in FIG. 1, a system for controlling valve timing of a continuous variable valve duration engine according to an exemplary embodiment of the present invention includes a data detector 10, a camshaft position sensor 20, a controller 30, a continuous variable valve duration (CVVD) device 50 and a continuous variable valve timing (CVVT) device 55.

The data detector 10 detects data related to a running state of the vehicle for controlling the CVVD device 50 and the CVVT device 55, and includes a vehicle speed sensor 11, an engine speed sensor 12, an oil temperature sensor 13, an air flow sensor 14 and an accelerator pedal position sensor 15.

The vehicle speed sensor 11 detects a vehicle speed, transmits a corresponding signal to the controller 30, and is mounted at a wheel of the vehicle.

The engine speed sensor 12 detects a rotation speed of the engine from a change in phase of a crankshaft, and transmits a corresponding signal to the controller 30.

The oil temperature sensor (OTS) 13 detects a temperature of an oil flowed through an oil control valve (OCV), and transmits a corresponding signal to the controller 30.

The oil temperature detected by the oil temperature sensor 13 may be measured a coolant temperature by using a coolant temperature sensor mounted at a coolant passage of an intake manifold. Therefore, in this specification and the scope of the appended claims, the oil temperature sensor 13 should include the coolant temperature sensor, and the oil temperature should be understood to be the coolant temperature.

The air flow sensor 14 detects an air amount drawn into the intake manifold, and transmits a corresponding signal to the controller 30.

The accelerator pedal position sensor 15 detects a degree at which a driver pushes an accelerator pedal, and transmits a corresponding signal to the controller 30. The position value of the accelerator pedal may be 100% when the accelerator pedal is pressed fully, and the position value of the accelerator pedal may be 0% when the accelerator pedal is not pressed at all.

A throttle valve position sensor (TPS) that is mounted on an intake pipe may be used instead of the accelerator pedal position sensor 15. Therefore, in this specification and the scope of the appended claims, the accelerator pedal position sensor 15 should include the throttle valve position sensor, and the position value of the accelerator pedal should be understood to be an opening value of the throttle valve.

The camshaft position sensor 20 detects a change of a camshaft angle, and transmits a corresponding signal to the controller 30.

The continuous variable valve duration (CVVD) device 40 controls an opening time of an intake valve and an exhaust valve of the engine according to a signal from the controller 30.

The continuous variable valve timing (CVVT) device 50 controls an opening and closing timing of the intake valve and the exhaust valve of the engine according to a signal from the controller 30.

The controller 30 determines an intake valve open (IVO) timing, an intake valve close (IVC) timing, an exhaust valve open (EVO) timing and an exhaust valve close (EVC) timing based on signals from the data detector 10 and the camshaft position sensor 20, and controls the CVVD device 40 and the CVVT device 50 according to the determined the IVO, IVC, EVO, and EVC timings.

For these purposes, the controller 30 may be implemented as at least one processor that is operated by a predetermined program, and the predetermined program may be programmed in order to perform each step of a method for controlling valve timing of a continuous variable valve duration engine according to an exemplary of the present invention.

Various embodiments described herein may be implemented within a recording medium that may be read by a computer or a similar device by using software, hardware, or a combination thereof, for example.

According to hardware implementation, the exemplary embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units designed to perform any other functions.

According to software implementation, embodiments such as procedures and functions described in the present embodiments may be implemented by separate software modules. Each of the software modules may perform one or more functions and operations described in an exemplary embodiment of the present invention. A software code may be implemented by a software application written in an appropriate program language.

Hereinafter, a method for controlling valve timing of a continuous variable valve duration engine according to an exemplary embodiment of the present invention will be described in detail with reference to FIG. 2.

Figure 2:
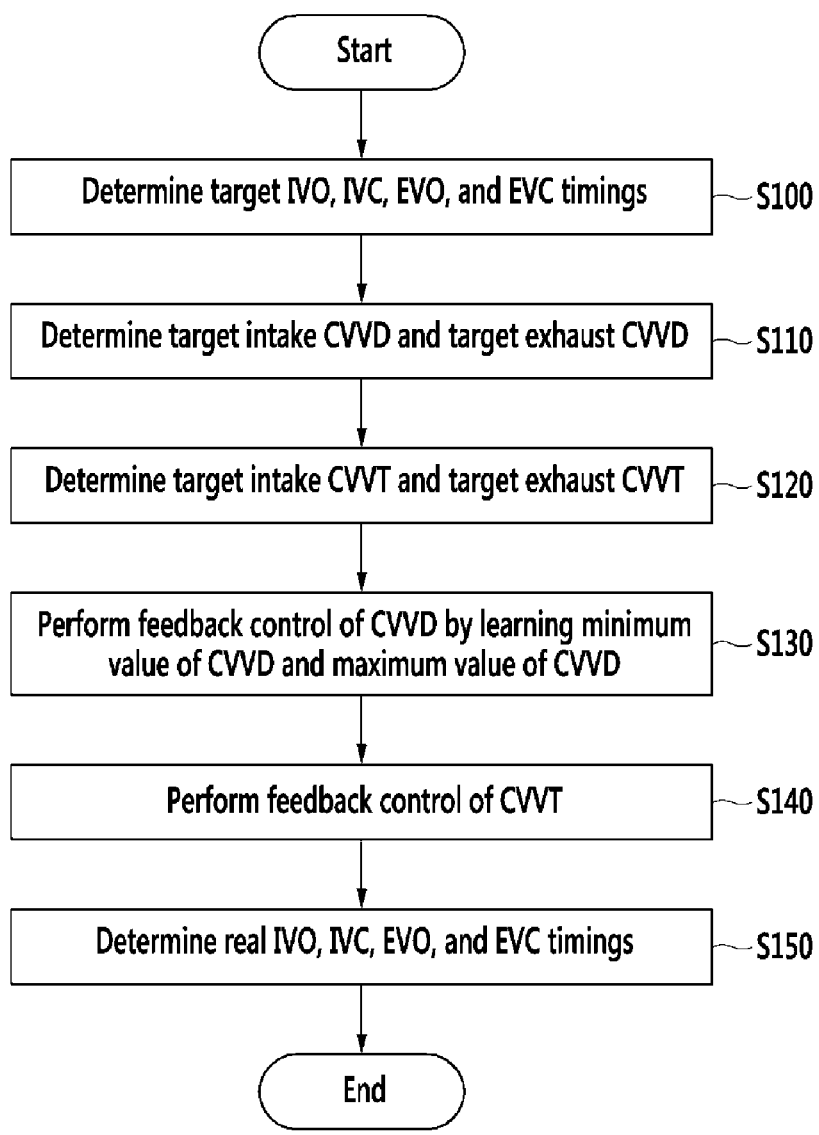
FIG. 2 is a flowchart showing a method for controlling valve timing of a continuous variable valve duration engine according to an exemplary embodiment of the present invention.
Figure 3:
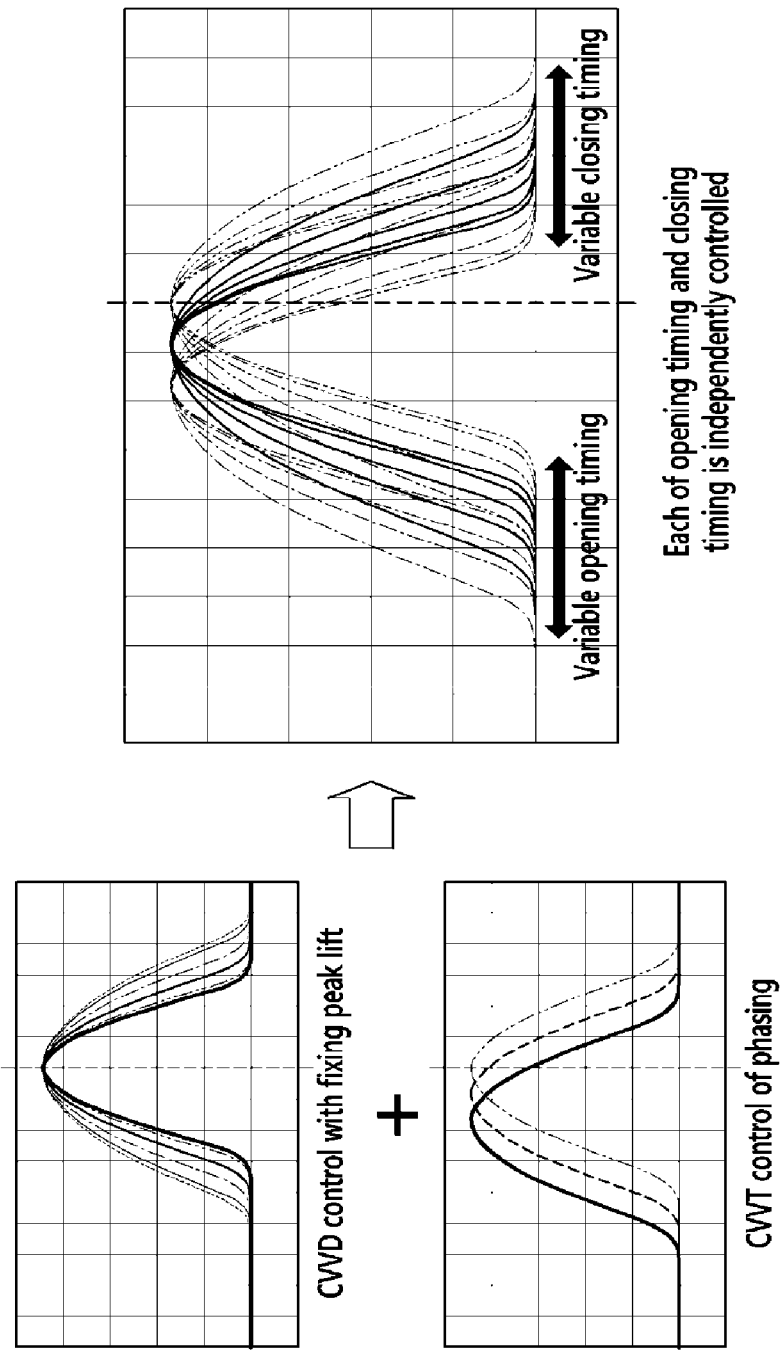
FIG. 3 is a diagram showing a situation in which a CVVD device and a CVVT device control an intake valve and an exhaust valve of the engine.

FIG. 2 is a flowchart showing a method for controlling valve timing of a continuous variable valve duration engine according to an exemplary embodiment of the present invention.

As shown in FIG. 2, a method for controlling valve timing of a continuous variable valve duration engine according to an exemplary embodiment of the present invention starts with determining a target intake valve open (IVO) timing, a target intake valve close (IVC) timing, a target exhaust valve open (EVO) timing and a target exhaust valve close (EVC) timing at step S100.

The target IVO, IVC, EVO, and EVC timings are determined in accordance with a crank angle of 1 mm lift reference point.

When the target IVO, IVC, EVO, and EVC timings are determined at the step S100, the controller 30 determines a target intake CVVD and a target exhaust CVVD to satisfy the target IVO, IVC, EVO, and EVC timings at step S110.

Herein, the target intake CVVD may be determined based on a difference value between the IVO timing and the IVC timing, and the target exhaust CVVD may be determined based on a difference value between the EVO timing and the EVC timing.

The controller 30 determines a target intake CVVT and a target exhaust CVVT to satisfy the IVO, IVC, EVO, and EVC timings at step S120.

When the target intake CVVD, the target exhaust CVVD, the target intake CVVT and the target exhaust CVVT are determined at the step S110 and the step S120, the controller 20 performs a feedback control of the CVVD by learning a minimum value of the CVVD and a maximum value of the CVVD at step S130.

Herein, the minimum value of the CVVD may learn a value of long duration, and the maximum value of the CVVD may learn a value of short duration. That is, if the minimum value of the CVVD is determined as 0%, and the maximum value of the CVVD is determined as 100%, the target intake CVVD and the target exhaust CVVD can be converted to a value of %, thereby performing the feedback control.

In addition, the controller 30 performs a feedback control of the CVVT based on profile information of the valve at step S140.

The feedback control of the CVVT may be performed by a position of the camshaft which is detected by the camshaft position sensor 25. Herein, the profile information of the valve may include a crank angle and CVVD data at a time point of maximum opening (peak lift).

When the feedback control of the CVVD and the feedback control of the CVVT are performed at the step S130 and the step S140, the controller 30 determines a real IVO timing, a real IVC timing, a real EVO timing, and a real EVC timing at step S150.

After that, the controller 30 controls the CVVD device 40 and the CVVT device 50 according to the real IVO, IVC, EVO, and EVC timings.

As described above, according to an exemplary embodiment of the present invention, duration and timing of the continuous variable valve is simultaneously controlled, so the engine may be is controlled under optimum conditions.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling valve timing of a continuous variable valve duration engine including a continuous variable valve duration (CVVD) device and a continuous variable valve timing (CVVT) device, comprising:
   determining a target intake valve open (IVO) timing, a target intake valve close (IVC) timing, a target exhaust valve open (EVO) timing and a target exhaust valve close (EVC) timing;
   determining a target intake CVVD, a target exhaust CVVD, a target intake CVVT and a target exhaust CVVT to satisfy the target IVO, IVC, EVO, and EVC timings;
   performing a feedback control of the CVVD by learning a minimum value of the CVVD and a maximum value of the CVVD;
   performing a feedback control of the CVVT based on profile information of a valve; and
   determining a real IVO timing, a real IVC timing, a real EVO timing, and a real EVC timing based on the feedback control of the CVVD and the feedback control of the CVVT.

2. The method of claim 1, wherein the target IVO, IVC, EVO, and EVC timings are determined by a crank angle of 1 mm lift reference point.

3. The method of claim 1, wherein the minimum value of the CVVD learns a value of long duration and the maximum value of the CVVD learns a value of short duration.

4. The method of claim 1, wherein the feedback control of the CVVT detects a position of a camshaft and is performed according to the position of the camshaft.

5. The method of claim 1, wherein the profile information of the valve includes a crank angle and CVVD data at a time point of maximum opening.

6. A system for controlling valve timing of a continuous variable valve duration engine, comprising:
   a data detector detecting data related to a running state of a vehicle;
   a camshaft position sensor detecting a position of a camshaft;
   a continuous variable valve duration (CVVD) device controlling an opening time of an intake valve and an exhaust valve of the engine;
   a continuous variable valve timing (CVVT) device controlling an opening and closing timing of the intake valve and the exhaust valve of the engine; and
   a controller configured to receive signal from the data detector and the camshaft position sensor and to control the CVVD device and the CVVT device,
   wherein the controller executes instructions for
      determining a target intake valve open (IVO) timing, a target intake valve close (IVC) timing, a target exhaust valve open (EVO) timing and a target exhaust valve close (EVC) timing, wherein the target IVO timing, the target IVC timing, the target EVO timing, and the target EVC timing are determined independently on each other,
      determining a target intake CVVD, a target exhaust CVVD, a target intake CVVT and a target exhaust CVVT to satisfy the target IVO, IVC, EVO, and EVC timings,
      performing a feedback control of the CVVD by learning a minimum value of the CVVD and a maximum value of the CVVD,
      performing a feedback control of the CVVT based on profile information of the valves, and
      determining a real IVO timing, a real IVC timing, a real EVO timing, and a real EVC timing based on the feedback control of the CVVD and the feedback control of the CVVT.

7. The system of claim 6, wherein the data includes information on at least one of a vehicle speed, an engine speed, an oil temperature, an amount of air flow and a position value of an accelerator pedal.

* * * * *